United States Patent [19]

Shaw

[11] Patent Number: 5,697,745

[45] Date of Patent: Dec. 16, 1997

[54] SCREW CAP

[76] Inventor: Jack B. Shaw, 2710 Bedford St., Johnstown, Pa. 15904

[21] Appl. No.: 567,774

[22] Filed: Dec. 5, 1995

[51] Int. Cl.[6] .................................................. F16B 39/00
[52] U.S. Cl. .................................................. 411/258; 411/930
[58] Field of Search ........................... 411/258, 82, 930, 411/429, 431, 377, 259, 525, 526

[56] References Cited

U.S. PATENT DOCUMENTS

| | | | |
|---|---|---|---|
| 972,140 | 10/1910 | Adam . | |
| 1,401,757 | 12/1921 | Brown | 411/258 |
| 2,775,917 | 1/1957 | Ferguson | 411/258 |
| 2,799,202 | 7/1957 | Patten | 411/525 |
| 2,878,905 | 3/1959 | Langermeier . | |
| 3,411,816 | 11/1968 | Andrews | 411/431 |
| 3,746,068 | 7/1973 | Deckert | 411/930 |
| 3,756,635 | 9/1973 | Beers . | |
| 4,280,391 | 7/1981 | Fischer | 411/15 |
| 4,400,123 | 8/1983 | Dunegan . | |
| 4,438,850 | 3/1984 | Kahn | 206/634 |
| 4,514,125 | 4/1985 | Stol | 411/258 |
| 4,536,524 | 8/1985 | Hart | 411/258 |
| 4,555,206 | 11/1985 | Sweeney | 411/258 |
| 4,681,477 | 7/1987 | Fischer . | |
| 4,693,652 | 9/1987 | Sweeney | 411/258 |
| 4,756,654 | 7/1988 | Clough | 411/429 |
| 4,826,380 | 5/1989 | Henry | 411/258 |
| 4,907,929 | 3/1990 | Johnston, Jr. . | |
| 4,915,289 | 4/1990 | Hatano | 229/123.1 |
| 5,129,770 | 7/1992 | Coleman . | |
| 5,308,922 | 5/1994 | Wallace | 411/258 |
| 5,419,666 | 5/1995 | Best . | |

FOREIGN PATENT DOCUMENTS 2505216 8/1976 Germany ................................ 411/258

Primary Examiner—Steven N. Meyers
Assistant Examiner—Gary Estremsky
Attorney, Agent, or Firm—Banner & Witcoff, Ltd.

[57] ABSTRACT

A push-on cap for covering the pointed, threaded end of a metal screw. The cap is filled with a polymer inert to the metal, and a curing catalyst, whereby the polymer and curing catalyst are separated until the cap is placed on the screw. The push-on cap is also readily removable from the screw.

7 Claims, 2 Drawing Sheets

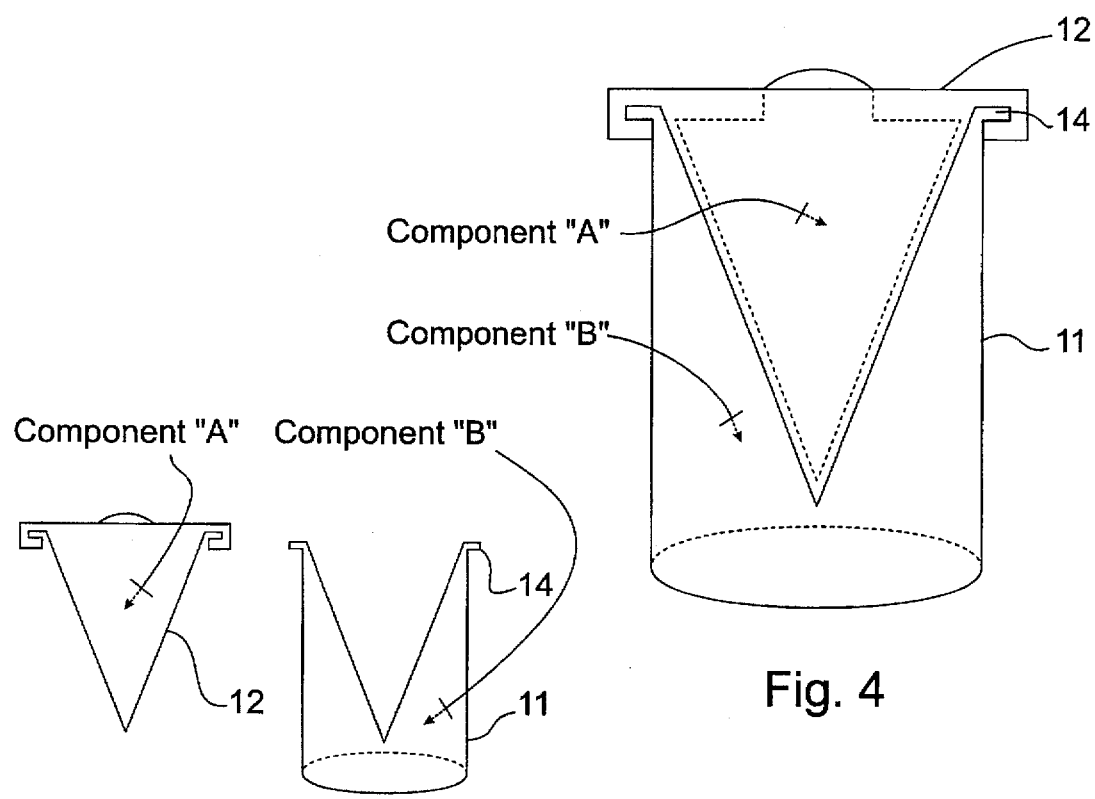

SCREW CAP

FIELD OF INVENTION

The present invention relates to a push-on cap for covering the pointed, threaded end of a screw.

BACKGROUND OF INVENTION

Often, screws are used in materials thin enough that the pointed ends of the screws will extend through the material, which can pose a hazard to humans and animals. The pointed ends of the screws are also exposed to various environmental conditions, such as humidity, resulting in corrosion and deterioration of the screws. Further, the pointed ends of the screws are exposed to heat and cold, which can result in a thermal transfer effect causing moisture to relentlessly form on and drip from the screws. This is particularly true when it is relatively cold outside and warm inside, or visa versa. The forming of this moisture on the screws then begins an oxidation process in the adjoining metal roofing and/or steel structure that will inevitably and relentlessly "wick" into the said metal and/or steel, and begin a process of rusting and, inevitably, rapid deterioration of the metal. Additionally, this forming of moisture will work itself into any insulation that may be in the area and quickly ruin it. Once wet and water-logged, this insulation can also cause rapid rusting and/or deterioration of the areas of metal with which it comes into contact.

There are available screw-on caps which cover the end of a screw, but these are typically made of metal and do not prevent deterioration from the elements, for example, humidity. Further, these screw caps are expensive and time-consuming to apply.

Also available are molded caps for placement on the end of a screw. See, for example, U.S. Pat. No. 2,878,905. Although these caps are less time-consuming to apply, they do not fully protect the screws from exposure to various conditions. Further, these molded caps are not intended to be removed except by prying with a knife or other lever-type implement.

Thus, there is a need for a push-on screw cap which not only covers the pointed, threaded end of a screw, but also protects the screw from environmental conditions, such as humidity, and from thermal transfer effects. There is also a need for a push-on cap which can be easily removed from the screw.

SUMMARY OF THE INVENTION

The present invention is directed to a push-on cap for covering the pointed, threaded end of a metal screw, the cap comprising a body having a closed end and an open end, the open end being covered by a removable or rupturable foil, the body being filled with a polymer inert to the metal, and a curing catalyst, the polymer and curing catalyst being separated until the cap is placed on the screw; whereby the foil is removed prior to use or the screw ruptures the foil during placement of said cap onto said metal screw.

Another embodiment of the present invention is directed to a push-on cap for covering the pointed, threaded end of a metal screw, the cap comprising a body having a closed end and an open end, said open end being covered by a snap-on lid, whereby the open end is adapted to receive said snap-on lid, the body being filled with a polymer inert to the metal and a curing catalyst, the polymer and curing catalyst being separated until the cap is placed over the screw.

A further embodiment of the present invention is directed to a push-on cap for covering the pointed, threaded end of a metal screw, the cap comprising first and second pieces joined together, the first piece comprising a cylindrical body having a closed end and an open end, the cylindrical body being filled with component B, the second piece comprising an insert that fits securely onto the first piece and is filled with component A, one of components A and B is a polymer material and the other is a catalyst, whereby when the cap is placed on the screw, the screw ruptures the wall of the second piece allowing components A and B to mix.

BRIEF DESCRIPTION OF THE DRAWINGS

FIGS. 4–6 all relate to yet another embodiment of the push-on cap in accordance with the present invention.

DETAILED DESCRIPTION OF THE INVENTION

Figure 1:
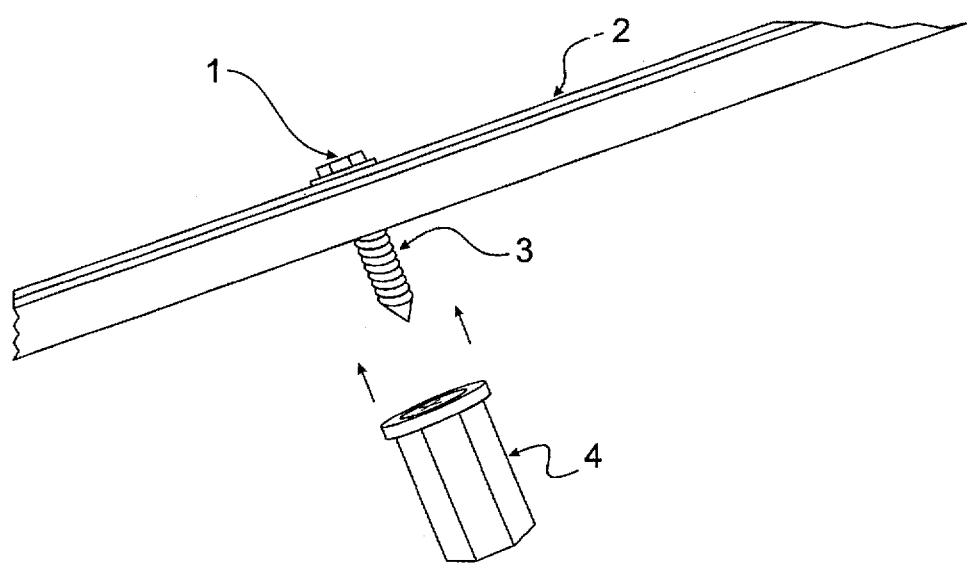
FIG. 1 depicts the placement of a push-on cap over a screw in accordance with the present invention.

Referring to FIG. 1, metal screw 1 is screwed through a substrate 2, such as a roof sheet and roof support member. The screw acts to hold the roof sheet against the roof support member. The end of metal screw 1 extends through the substrate 2 and has an exposed end 3. A push-on cap 4 is placed over the metal screw 1 so as to cover the exposed end of the screw.

The metal screw may be any screw, such as that used in the roofing industry. The screw can have a polygonal head, such as a hex, and/or a screw driver slot. Such screws are well known in the art.

The substrate may be any substrate, such as a roof sheet, shingles, aluminum sheets for siding or awnings, and the like, which is attached to a support member, such as a steel roof support member.

Figure 2:
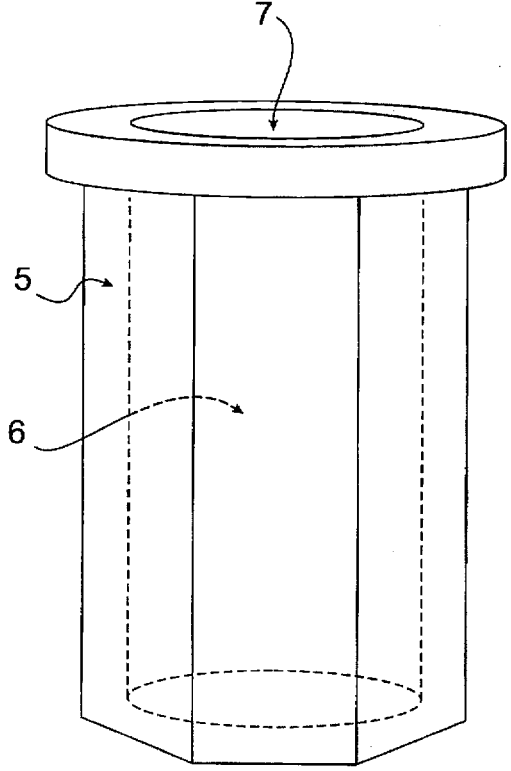
FIG. 2 depicts one embodiment of the push-on cap in accordance with the present invention.

FIG. 2 depicts one embodiment of the structure of the push-on cap. The cap has a body 5 that is closed at one end and open at the other. The body is preferably shaped so as to be removable by a socket, suitable wrench, or other gripping device. Preferably the body is polygonal in shape, more preferably hexagonal.

The body may be made of any plastic material, such as polyethylene, or any of the various complex organic compounds produced by polymerization capable of being molded, extruded, or cast into various shapes, or other similar flexible, elastic, malleable, pliable, pliant, moldable, and/or adaptable material. Any plastic or other adaptive material that is rigid enough to keep its shape, but not so brittle as to be prone to cracking, may be used.

The body is filled with a liquid or semi-solid polymer 6 which is inert to the metal of the screw. Such polymers include polyurethane, polyethylene, epoxy resins, or any of the various thermoplastics or thermosetting resins, or synthetic resins or various thermosetting epoxy resins or epoxy resins that polymerize spontaneously when mixed with a phenol (catalyst) forming a strong, hard, resistant adhesive. Preferably, polyurethane is used. The polymer is cured after the push-on cap is placed on the screw. For example, the polymer and a curing catalyst for curing the polymer may each be encapsulated so that when the cap is placed over the screw, the screw breaks the capsules, thus mixing the polymer and curing catalyst.

Any appropriate procedures may be used to encapsulate the polymer and the curing catalyst. The polymer and curing catalyst may form an adhesive, such as one manufactured by The National Cash Register Company, Dayton, Ohio, known as "RDH-035 Encapsulated Adhesive PEF 312," which is believed to be a polyester/epoxy capsular adhesive having capsules ranging between about 500 and 800 microns in size, a polyethylene-vinyl acetate copolymer shell or wall material, and comprising 90 percent adhesive by weight. Another is identified by the same manufacturer as IPP 536, which is believed to be a polyester adhesive having capsules ranging between about 500–800 microns in size and including a curing catalyst coated on the exterior walls of the capsules. However, it is to be understood that a variety of hydrophilic adhesives, including polyesters, polyamides, and epoxies, may be encapsulated using wall or shell membrane materials, such as gelatin, polyvinyl alcohol, hydroxy ethyl cellulose, or methyl cellulose.

Alternatively, the polymer and a curing catalyst are separated by a rupturable membrane within the capsule. While placing the cap on the screw, the screw would break the membrane, thus allowing the polymer and curing catalyst to mix. Any other suitable means to separate the polymer and catalyst may be used.

The open end of the push-on cap is covered by a rupturable or removable foil seal 7. The foil seal is either ruptured by the screw when the cap is placed over the screw, or the foil is removed and then the cap placed over the screw. The foil may be aluminum or any other suitable metallic element.

Figure 3:
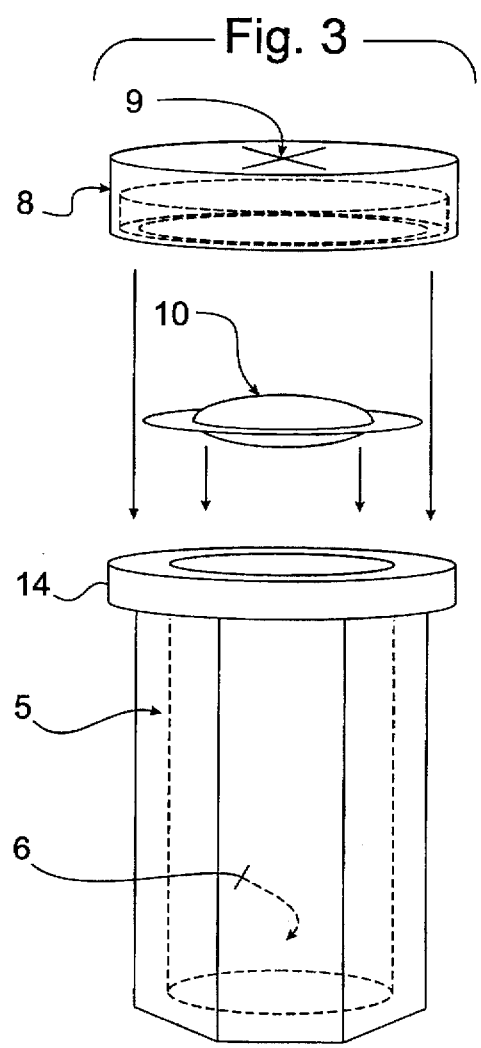
FIG. 3 depicts another embodiment of the push-on cap in accordance with the present invention.

In another embodiment, instead of a foil, a snap-on lid 8 is placed over the open end of the body, as shown in FIG. 3. The lid is typically of a plastic material, which may be the same as or different from the body and may have a pre-cut reduced thickness portion 9 to help align and push the screw through the cap. In this embodiment, the cylindrical body may have a ridge or lip 14 at its open end and the snap-on lid would have a ridge or lip 14 which would snap onto the ridge or lip of the cylindrical body.

In a related embodiment, a capsule containing a curing catalyst 10 is placed over the open end of the body, and the snap-on lid is placed over the catalytic agent and snapped onto the body. The screw pierces the lid and the capsule, and the catalytic agent is then mixed with the polymer in the cylindrical body.

Another embodiment is depicted in FIGS. 4–6, whereby, the push-on cap is made of two pieces. As shown in FIG. 5, the first, or bottom, piece is a cylindrical container 11 having a closed end and an open end which holds a component B. Component B is a liquid or semi-solid which will conform to the shape of the second piece when it is inserted. As shown in FIG. 6, the second piece or cover piece 12 contains component A.

As shown in FIG. 4, the second piece is placed onto the first piece and joined by a snap-on connection. The top on the second piece comprises foil or a scored top for insertion over a screw. An example of a scored top is shown in FIG. 3 in lid 9. When the cap is placed over a screw, the screw permeates the cap and ruptures the wall of the second piece allowing components A and B to mix together.

One of components A and B is of a polymer material, and the other is a curing catalyst. The amounts of components A and B are determined by the particular polymer and curing catalyst chosen. The ratios being well known in the prior art.

Preferably component B is the polymer material and component A is the curing catalyst.

The push-on cap can also serve as a "lock-tight" for the screw preventing the screw from backing out of its socket. Conventionally and historically locking the screw tight has been accomplished by either using lock washers and/or lock type nuts. However, with the screw cap, once pushed into place and after the polymer has obtained the required set time, the subject screw will be locked into place prohibiting it from backing out of its socket until and unless the screw cap has been removed by turning with a rachet and socket and/or typical wrench.

It will be apparent to those skilled in the art that various modifications and variations can be made in the embodiments of the present invention without departing from the spirit or scope of the invention. Thus, it is intended that the present invention cover the modifications and variations of this invention provided they come within the scope of the appended claims and their equivalents.

What is claimed is:

1. A push-on cap for covering the pointed, threaded end of a metal screw, the cap comprising a body having a closed end and an open end, said open end terminating in a lip extending laterally from said open end, being covered by a snap-on lid, said lid including a lip extending downwardly and inwardly to co-act with said lip of said cap, the body being filled with a polymer, said lid including an encapsulated curing catalyst, the polymer and curing catalyst being separated until the cap is pushed onto the screw.

2. The push-on cap according to claim 1, wherein said body has a polygonal shape whereby the cap is readily removable from the screw.

3. The push-on cap according to claim 1, further comprising a foil capsule containing a catalytic agent between the lid and the open end of the body, the capsule being rupturable by the screw when the screw is pushed onto the cap.

4. The push-on cap according to claim 1, wherein the polymer and curing catalyst are separated by a rupturable membrane.

5. The push-on cap according to claim 1, wherein the polymer is encapsulated.

6. A push-on cap for covering the pointed, threaded end of a metal screw, the cap comprising first and second pieces joined together, the first piece comprising a body having a closed end and an open end, said open end terminating in a lip extending laterally therefrom, the body being filled with component B, the second piece comprising a conical insert that fits securely into the first piece and is filled with component A, said conical insert terminating at an upper end lip extending inwardly to co-act with the lip of said first piece, one of components A and B being a polymer of the screw with the other being a curing catalyst therefor, whereby when the cap is placed on the screw, the screw ruptures the conical wall of the second piece allowing components A and B to mix.

7. The push-on cap according to claim 6, wherein said body has a polygonal shape whereby the cap is readily removable from the screw.

* * * * *